Aug. 30, 1966 G. MAXEINER 3,269,757

BALL AND SOCKET JOINT

Filed Jan. 28, 1964

United States Patent Office 3,269,757
Patented August 30, 1966

3,269,757
BALL AND SOCKET JOINT
Gottfried Maxeiner, Dusseldorf, Germany, assignor to A. Ehrenreich & Cie, Dusseldorf-Oberkassel, Germany
Filed Jan. 28, 1964, Ser. No. 340,726
Claims priority, application Germany, Jan. 29, 1963, E 24,250
9 Claims. (Cl. 287—87)

This invention relates to a ball and socket joint for wheel suspensions of motor vehicles and for steering rods of wheel suspensions and more particularly to a ball and socket joint in which the stud head received in the joint housing comprises an integral ball part at the end and an other ball part having a central bore for the stud shaft with a flattened end portion for engaging the integral ball part at the end of the stud shaft.

In its application in a wheel suspension or as a wheel joint the ball joint serves to absorb the weight of the vehicle. As the vehicle weight puts a constant load on the joint, any existing play of the joint in the axial direction of the joint stud normally does not constitute a disturbing factor in driving the vehicle. However, this is not the case with regard to forces which are directed transversely to the axis of the joint stud and which exert a stress on the joint and may vary constantly during the driving of the vehicle. For this reason it is necessary that the wheel joint be without play transversely to the direction of the joint stud. The lack of play in the ball joints of the above mentioned type may only be obtained in that the central opening or bore of the ball segment and of the joint stud are made to match perfectly. Such an exact matching of the opening or bore of the ball segment with the joint stud increases the manufacturing costs quite considerably, especially during mass production.

It is therefore an object of this invention to avoid this necessity of an exact matching between the shaft of the joint stud and the ball segment to reduce the manufacturing costs.

According to the invention this object is obtained in providing the ball segment with radial slots to obtain resiliency in the ball segment. The effect of the radial slots and of the resiliency thus obtained resides in that the wheel load which constantly rests on the joint and which presses the ball segment into the bearing seat in the ball housing, causes simultaneously a radial compression of the ball segment to reduce the width of the slots, and thus produces a contacting of the walls of the opening or bore in the ball segment with the stud shaft.

The ball segment consists preferably of an elastic or resilient material, such as a synthetic material. The radial slots may be made so that they alternate starting from the outside of the ball segment and from the opening or bore of the ball segment and may have a limited depth. This design provides an improvement of the resiliency characteristics to fulfil the objects of this invention. In the case where the slots are made only to a limited radial depth and where they have the form of recesses, the base of the recesses may have an unequal distance from the wall of the opening or bore of the ball segment in the arrangement where the slots are made from the outside. The slots which are made starting in the opening or bore of the ball segment may also have the form of recesses whose one end facing the ball portion which is integral with the joint stud and whose other end remote from this ball portion are in contact with the joint stud.

Another embodiment may consist in an arrangement in which the radial slots divide the ball segment into sectors which have on the sector surfaces facing each other surface portions which are relatively small compared to the size of these surfaces and designed as abutment portions between adjacent sectors. These abutment portions or projections limit the radial compression of the sectors against the joint stud during normal load of the joint. However, when the ball portion is formed of an elastic or resilient material they flow or spread when the joint load becomes too large.

The opposing sides of the sectors may also interengage by means of a projection and a recess. This prevents a movement of the sectors relative to each other in the axial direction of the joint stud. In this arrangement a recess may also be formed in the base of one sector which may abut with a projection on the other sector or conversely.

The invention will be described hereafter in greater detail by means of an embodiment of the invention in combination with the accompanying drawing in which.

Figure 1:
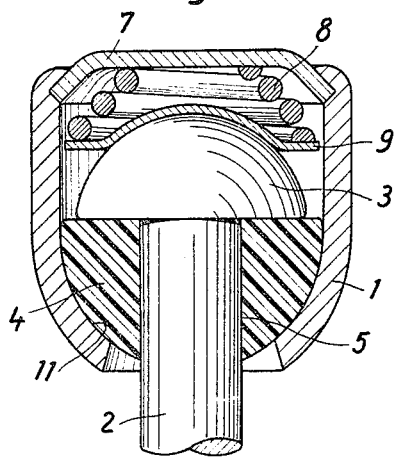
FIGURE 1 shows an elevation view, partly in section, of a ball joint including a ball stud according to the invention.

In the drawing the ball joint shown in FIGURE 1 consists of a joint housing 1 and a joint stud 2. A ball head is provided on the joint stud 2 and is received in the joint housing, the joint stud is journalled in the joint housing by means of this ball head. For this purpose the joint housing has on the inside at the end through which the joint stud penetrates from the housing a hollow spherical support or bearing surface 11. The ball head consists of a ball part 3 which is fixed to the end of the joint stud 2 and is of one piece or integral with the stud, and of an other ball part in the form of a ball segment 4 through which the ball stud extends and which bears with its flat surface portion against the corresponding flat surface portion of the ball part 3 fixed to the end of the stud. The receiving bore in the ball segment 4 is indicated by numeral 5.

In the embodiments illustrated in the drawing the ball segment 4 is made of a synthetic material. In the joint illustrated in FIGURE 1 a plate or plate spring 9 rests on the ball part 3 of the joint stud. This plate member 9 has a curvature which corresponds to the curvature of the ball part 3 at the contacting surface. A compression spring 8 which is compressed between a housing cover 7 and a flat rim portion of plate 9 urges the plate 9 against the ball part 3 so that ball part 4 is pressed into its bearing seat through ball part 3.

Figure 2:
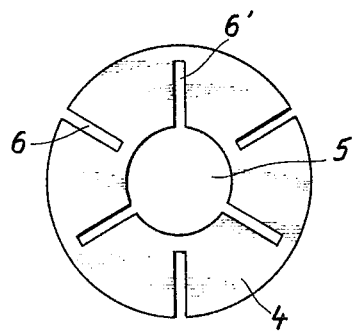
FIGURE 2 shows a plan view of the ball segment of the ball head surrounding the ball stud.

With reference to FIGURE 2, the ball segment 4 shows radial slots 6 and 6', the radial slots 6 extending from the outside of the segment and the radial slots 6' extending from the inside or from the opening or bore 5. The slots 6 starting on the outside and slots 6' starting on the inside may be arranged in an alternating manner.

Figure 3:
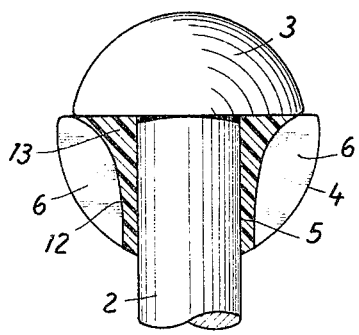
FIGURE 3 shows a side view partly in section of a ball stud according to the invention in which the lower ball segment is slotted inwardly from the outside and to unequal depths.

As shown in FIGURE 3, the base 12 of the slots or recesses made from the outside of the ball segment does not extend parallel to the joint studs so that this base does not have an equal distance from the inner wall of the opening or bore 5 of this ball segment. In this figure the wall thickness 13 adjacent the ball part 3 is larger from the base to the bore of the ball segment than at the side remote from the ball part 3.

Figure 4:
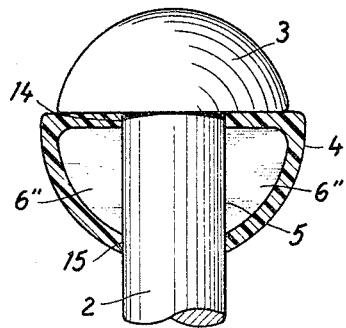
FIGURE 4 shows a ball stud according to the invention in which the lower ball segment has slots extending from the bore outwardly and between the upper and lower ends.

In FIGURE 4 the slots 6″ are made from the opening or bore of the ball segment 4. These slots form recesses between the bore edge 14 of this ball segment adjacent the ball part 3 and in contact with the stud, and the bore edge 15 in contact with the joint stud on the end remote from the ball part 3. It is also possible to provide a ball segment with slots 6 according to FIGURE 3 and with slots 6″ according to FIGURE 4 and arranged in an alternating manner.

Figure 5:
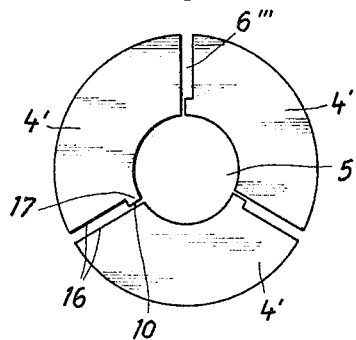
FIGURE 5 is a plan view of a lower ball segment divided by radial slots into separate sectors which may abut through projections on opposite surfaces of the sectors.

In the embodiment illustrated in FIGURE 5 the ball segment is divided by means of radial slots 6‴ into individual sectors 4′, for example into three sectors. On the side of the opening or bore 5 a projection 17 is provided on one of the opposite sector surfaces 16, this projection having a small surface area 10 in relationship to the surface area of the sector and this surface of the projection is adapted to abut the opposite sector surface.

Figure 6:
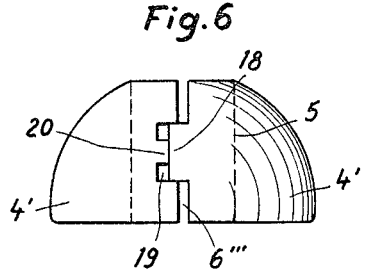
FIGURE 6 shows an elevation view of a lower ball segment in the upside-down position with respect to FIGURES 1, 3 and 4 and separated by radial slots into individual sectors wherein adjacent sectors interengage with corresponding projections and recesses.

In FIGURE 6 a ball segment is shown which is illustrated in the upside-down position of the segments shown in FIGURES 1, 3 and 4, and this segment is also provided with slots 6‴ to provide individual sectors 4′. The adjacent sectors are in interengagement with each other. For this purpose one of two adjacent sectors has a projection 18 which, in the embodiment shown, has a rectangular form while in the other sector a correspondingly formed recess 19 is provided for receiving the projection 18. At the base of the recess 19 a projection or addition 20 is provided which serves as abutment for the projection 18 or as an abutment which may come into contact with projection 18.

It is also possible to provide the projection 20 on the projection 18 and that it makes contact at the base of the recess 19.

What is claimed is:

1. A ball and socket joint comprising:
    a hollow housing having a bore extending therethrough,
    said housing having an inturned segmental spherical wall portion at one end of said bore defining a restricted opening,
    closure means at the other end of said bore,
    a first ball part of segmental spherical form having a flat side and a bore extending therethrough,
    said segmental spherical form of said ball part engaging said segmental spherical wall portion of said housing,
    a joint stud having a shaft extending through said bore of said ball part,
    a second segmental spherical ball part at the end of said joint stud and having a flat side for engaging said flat side of said first ball part, and
    a plurality of slots extending radially into said first ball part, each of said slots being closed at one end thereof by a portion of said ball, said portion being relatively small in a radial direction as compared to the overall radial length of said slots and closing said slots from adjacent said flat side to the opposite end of said first ball part.

2. A ball and socket joint according to claim 1, wherein said radial slots extend alternately through said first ball part from the outside of said ball part and from the inside of said bore of said ball part.

3. A ball and socket joint comprising:
    a hollow housing having a bore extending therethrough,
    said housing having an inturned segmental spherical wall portion at one end of said bore defining a restricted opening,
    closure means at the other end of said bore,
    a first ball part of segmental spherical form having a flat side and a bore extending therethrough,
    said segmental spherical form of said ball part engaging said segmental spherical wall portion of said housing,
    a joint stud having a shaft extending through said bore of said ball part,
    a second segmental spherical ball part at the end of said joint stud and having a flat side for engaging said flat side of said first ball part, and
    a plurality of slots extending radially into said first ball part,
    said slots extend radially part-way through said first ball part from the outside to a varying depth providing a continuous portion of said first ball part with a varying thickness adjacent said bore.

4. A ball and socket joint according to claim 3 wherein said continuous portion adjacent said bore decreases in the axial direction of said bore from said flat side of said first ball part.

5. A ball and socket joint comprising:
    a hollow housing having a bore extending therethrough,
    said housing having an inturned segmental spherical wall portion at one end of said bore defining a restricted opening,
    closure means at the other end of said bore,
    a first ball part of segmental spherical form having a flat side and a bore extending therethrough,
    said segmental spherical form of said ball part engaging said segmental spherical wall portion of said housing,
    a joint stud having a shaft extending through said bore of said ball part,
    a second segmental spherical ball part at the end of said joint stud and having a flat side for engaging said flat side of said first ball part, and
    a plurality of slots extending radially into said first ball part,
    said radially extending slots divide said first ball part into separate sectors and that at least one projection is provided on at least one of two opposite surfaces of two adjacent sectors, said projection having a small radial surface relative to the entire radial surface of said opposite surfaces.

6. A ball and socket joint according to claim 5, wherein the two opposite radial surfaces of adjacent sectors are interengaged by at least one projection and a corresponding recess on opposite radial surfaces.

7. A ball and socket joint according to claim 6, wherein a projection extends from the base of said recess in one opposite radial surface and engages said corresponding projection in the other opposite radial surface.

8. A ball and socket joint according to claim 6, wherein a projection extends from said projection on one opposite radial surface and engages the base of a recess in an opposite radial surface.

9. A ball and socket joint comprising:
    a hollow housing having a bore extending therethrough,
    said housing having an inturned segmental spherical wall portion at one end of said bore defining a restricted opening,
    closure means at the other end of said bore,
    a first ball part of segmental spherical form having a flat side and a bore extending therethrough,
    said segmental spherical form of said ball part engaging said segmental spherical wall portion of said housing,
    a joint stud having a shaft extending through said bore of said ball part,
    a second segmental spherical ball part at the end of said joint stud and having a flat side for engaging said flat side of said first ball part, and a plurality of slots extending radially into said first ball part, said slots extend part-way through said first ball part form the inside of said ball bore to provide recesses extending within said segmental spherical form of said first ball part to provide continuous portions of said first ball part around both ends of said bore.

References Cited by the Examiner

UNITED STATES PATENTS

| | | | |
|---|---|---|---|
| 169,383 | 11/1875 | Starr | 287—88 |
| 424,572 | 4/1890 | Painter | 287—12 |
| 1,101,601 | 6/1914 | Wendt | 308—72 X |
| 1,574,899 | 3/1926 | Kellogg | 287—88 X |
| 2,077,582 | 4/1937 | Peo. | |
| 2,260,283 | 10/1941 | Halford et al. | |
| 2,873,130 | 2/1959 | Moskovitz. | |
| 2,937,895 | 5/1960 | Langen et al. | 287—87 |
| 3,091,486 | 5/1963 | Baker. | |

CARL W. TOMLIN, *Primary Examiner.*

EDWARD C. ALLEN, *Examiner.*

A. V. KUNDRAT, *Assistant Examiner.*